United States Patent Office 2,934,507
Patented Apr. 26, 1960

2,934,507
POLYVINYL CHLORIDE RESINS STABILIZED WITH MIXTURES OF PHOSPHONATE ESTERS, EPOXY COMPOUNDS AND METALLIC SALTS OF FATTY ACIDS

David H. Chadwick, St. Louis, and Theodor Reetz, Webster Groves, Mo., assignors to Monsanto Chemical Company, St. Louis, Mo., a corporation of Delaware No Drawing. Application June 18, 1954
Serial No. 437,864

6 Claims. (Cl. 260—23)

This invention provides stabilized vinyl halide resin compositions which are especially designed to withstand the action of light. More particularly, this invention relates to polyvinyl chloride resin compositions containing polymers and copolymers of vinyl chloride possessing improved resistance to discoloration by the action of light.

It has already been proposed to prepare stabilized vinyl chloride compositions containing allyl phosphite esters in combination with epoxy compounds and fatty acid salts. Such compositions have not been particularly satisfactory in overcoming the effects of long-continued exposure to light and moisture.

We have now found that particularly effective stabilization for vinyl chloride containing polymers and copolymers is obtained by substituting certain phosphonate esters in place of the allyl phosphites in the stabilizing component with the epoxy compound and fatty acid salts.

The phosphonates useful for the present purpose are those having a boiling point of at least 136° C./1.5 mm., a molecular weight of at least 225 and preferably not above 450. More particularly preferred are those compounds wherein the molecular weight range is between 233 and 418.

Still more particularly stated, the phosphonates useful for the present purpose are those defined by the formula:

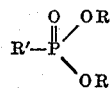

where R' is a 2-8 carbon atom alkyl, chloroalkyl, alkenyl or alkoxyalkyl radical. More specifically, R' may be a normal or branched-chain saturated or unsaturated alkyl or alkenyl radical, such, for example, as vinyl, allyl, beta-chloroethyl, vinyloxyethyl, phenylethyl or phenoxyethyl.

R may be the same as R' in any one compound or R may be a different radical though it will be chosen from the R' groups as defined above. Mixtures of compounds containing radicals or mixtures of radicals corresponding to the above definition may, of course, be employed.

The epoxy compound useful in connection with the above-defined phosphonate may be any epoxy compound boiling above 200° C. at atmospheric pressure. Suitable epoxy compounds are phenoxypropene oxide, epoxidized oleyl alcohol, epoxidized fatty acids, epoxidized fatty acid glycerides, such, for example, as epoxidized soya oil.

The fatty acid salts useful in the present combination are the alkali (sodium or potassium) alkaline earth (calcium or magnesium) or cadmium salts of fatty acids having at least 10 and preferably not in excess of 18 carbon atoms in the molecule or mixtures thereof. Especially preferred for the present purpose are mixtures of barium or cadmium laurate.

In order to obtain the maximum benefit from the present discovery, it is necessary that each stabilizing component be present in an amount lying between 1% and 5% by weight based on the vinyl halide resin.

The stabilized vinyl chloride resin is prepared by mixing the polyvinyl chloride, a suitable plasticizer, the phosphonate ester, the epoxy compound and the fatty acid salt together and milling the mixture on heated rolls until a homogeneous product is obtained. The rolls should be maintained at a suitable temperature at which the vinyl polymer is workable, but generally should not be heated above about 170° C. The time of milling should generally not be longer than necessary in order to obtain a uniform product.

The plasticized and stabilized resin is removed from the milling rolls in the form of a sheet and may be further processed by rolling or extrusion in any fashion, as is customarily employed in the plastic arts.

It is clearly recognized by the art that vinyl chloride homopolymers must be plasticized in order to obtain maximum usefulness in the production of films and the art is replete with suggestions of various plasticizers to be used for this purpose. The same is true of many copolymers of vinyl chloride where the percentage of copolymerized vinyl chloride is high or where the monomer which is copolymerized with the vinyl chloride is one imparting rigidity and brittleness to the copolymer. On the other hand, there are copolymers of vinyl chloride with other monomers (for example vinyl acetate) which imparts softness and flexibility to the copolymers. In these cases plasticizers are either not required or only a relatively small amount of plasticizer is necessary to achieve the desired effect.

The particular combination of stabilizing ingredients herein-disclosed are effective in the presence or in the absence of plasticizers and are useful with all polyvinyl chloride copolymers which contain more than 50% by weight of vinyl chloride in the polymer molecule.

The following examples illustrate the present invention:

Example 1

A mixture consisting of 100 parts of polyvinyl chloride, 47 parts of dioctyl phthalate, 3 parts of bis(beta-chloroethyl) beta-chloroethanephosphonate, 3 parts of epoxidized soya oil, and 2 parts of a mixture of barium and cadmium laurates is milled on rolls heated to 160° C. until homogeneous, and then formed into sheets. A sample of the sheet so formed was exposed to light and moisture in a weatherometer for 1000 hours, according to the method described in ASTM method D822–46T. After 800 hours of such exposure a few minute dark spots were observed. After an exposure of 1000 hours the sample was uniformly dark.

Example 2

A similar mixture of polyvinyl chloride, dioctyl phthalate, epoxidized soya oil and mixed barium-cadmium laurates was prepared as in Example 1 above, but in this case 3 parts of bis(beta-chloroethyl) ethylenephosphonate was employed in the place of the beta-chloroethanephosphonate. Exposure to light and moisture in the weatherometer for 1000 hours developed only a very small dark spot in the resin, which was otherwise clear and uncolored.

Example 3

A similar mixture of polyvinyl chloride resin, dioctyl phthalate, epoxidized soya oil and mixed barium-cadmium laurates was prepared as in Example 1 above, but in this case 3 parts of bis(2-octyl) 2-ethylhexanephosphonate was employed. Exposure to light and moisture in the weatherometer for 1000 hours developed an appreciably cloudy effect, but only after 800 to 1000 hours of exposure.

Example 4

Another mixture of polyvinyl chloride resin, dioctyl phthalate, epoxidized soya oil and mixed barium-cadmium laurates was prepared as in Example 1 above, but in this case dibutyl allylphosphonate was employed as the phosphonate ingredient. Exposure to light and moisture in the weatherometer for 1000 hours developed somewhat of a cloudy discoloration, but only after about 1000 hours' exposure.

Example 5

A mixture consisting of 100 parts of polyvinyl chloride resin, 50 parts of dioctyl phthalate, 3 parts of epoxidized oleyl alcohol and 2 parts of mixed barium-cadmium laurate and 3 parts of bis(2-octyl) 2-ethylhexanephosphonate were milled on the rolls at 160° C. until homogeneous and then formed into sheets. A sample of the sheet was exposed for 1000 hours on the weatherometer. No visible discoloration appeared in the sample upon examination after exposure.

What we claim is:

1. A resinous composition comprising a resinous homopolymer of vinyl chloride and as a stabilizer homogeneously distributed therein the combination of (1) from 1 to 5% by weight based on said resin of a phosphonate having the structural formula:

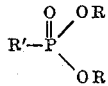

where R and R' are radicals selected from the class consisting of alkyl, chloroalkyl and, alkenyl radicals of from 2 to 8 carbon atoms, (2) from 1 to 5% based on said resin of a 1,2-epoxy compound boiling above 200° C. at normal atmospheric pressure and (3) from 1% to 5% by weight, based on said resin of a metal salt of a fatty acid having at least 10 and not in excess of 18 carbon atoms in the molecule.

2. A resinous composition comprising a resinous homopolymer of vinyl chloride and as a stabilizer therein the combination of (1) from 1% to 5% by weight based on said resin of bis(beta-chloroethyl) beta-chloroethanephosphonate, (2) 1% to 5% by weight based on said resin of a 1,2-epoxy compound boiling above 200° C. at normal atmospheric pressure and (3) from 1% to 5% by weight, based on said resin, of a metal salt of a fatty acid having from 10 to 18 carbon atoms in the molecule.

3. A resinous composition comprising a resinous homopolymer of vinyl chloride and as a stabilizer therein the combination of (1) from 1% to 5% by weight based on said resin of bis(2-octyl)-2-ethylhexanephosphonate, (2) from 1% to 5% by weight based on said resin of a 1,2-epoxy compound boiling above 200° C. at normal atmospheric pressure and (3) from 1% to 5% by weight based on said resin of a metal salt of a fatty acid having from 10 to 18 carbon atoms in the molecule.

4. A resinous composition comprising a resinous homopolymer of vinyl chloride and as a stabilizer therein the combination of (1) from 1% to 5% by weight based on said resin of dibutyl allylphosphonate, (2) from 1% to 5% by weight based on said resin of a 1,2-epoxy compound boiling above 200° C. at normal atmospheric pressure and (3) from 1% to 5% by weight based on said resin of a metal salt of a fatty acid having from 10 to 18 carbon atoms in the molecule.

5. A resinous composition comprising a resinous homopolymer of vinyl chloride and as a stabilizer therein the combination of (1) from 1% to 5% by weight based on said resin of bis(2-octyl) 2-ethylhexanephosphonate, (2) from 1% to 5% by weight based on said resin of epoxidized oleyl alcohol and (3) from 1% to 5% by weight, based on said resin of a mixture of barium and cadmium laurate.

6. A resinous composition comprising a resinous homopolymer of vinyl chloride and as a stabilizer therein the combination of (1) from 1% to 5% by weight based on said resin of bis(beta-chloroethyl) ethylenephosphonate, (2) from 1% to 5% by weight based on said resin of epoxidized soya oil and (3) from 1% to 5% by weight, based on said resin of a mixture of barium and cadmium laurate.

References Cited in the file of this patent

UNITED STATES PATENTS

| 2,224,695 | Prutton | Dec. 10, 1940 |
| 2,456,216 | Richter | Dec. 14, 1948 |
| 2,516,168 | Woodstock | July 25, 1950 |
| 2,720,535 | Kosolapoff | Oct. 11, 1955 |
| 2,739,952 | Linville | Mar. 27, 1956 |

OTHER REFERENCES

Kosolapoff: "Organophosphorus Compounds," published by Willey and Sons, 1950, pages 121 and 122.

Jungnickel et al.: Organic Analysis, vol. I, 1953, pages 127 and 128.